United States Patent [19]
DeLuca

[11] Patent Number: 5,755,328
[45] Date of Patent: May 26, 1998

[54] FLUTTER VALVE ASSEMBLY FOR INFLATABLE PACKAGING AND THE LIKE

[76] Inventor: Nicholas Paolo DeLuca, 1 Peabody Pl., Jamaica Plain, Mass. 02130

[21] Appl. No.: 745,220

[22] Filed: Nov. 8, 1996

Related U.S. Application Data

[63] Continuation of Ser. No. 278,610, Jul. 21, 1994, abandoned.

[51] Int. Cl.⁶ .................................................. B65D 81/03
[52] U.S. Cl. ........................................ 206/522; 206/814
[58] Field of Search ................................. 206/522, 814; 383/3; 137/512.15, 512.4, 846

[56] References Cited

U.S. PATENT DOCUMENTS

| | | | |
|---|---|---|---|
| 4,708,167 | 11/1987 | Koyanagi | 137/512.15 |
| 4,850,912 | 7/1989 | Koyangi | 137/512.15 X |
| 5,178,281 | 1/1993 | Enzu | 206/522 |
| 5,263,587 | 11/1993 | Elkin et al. | 206/522 |

*Primary Examiner*—Jacob K. Ackun
*Attorney, Agent, or Firm*—Rines and Rines

[57] ABSTRACT

A novel flat tubular plastic flutter valve for filling adjacent thin film evelope chambers into which it is peripherally sealed, as for cushioning and protecting items to be shipped within folder-over chambers, and in which the valve is notched to divide from a common external fluid (preferably air) filling inlet into a pair of independent flutter valve outlets one extending into each of the adjacent chambers and diverging from one another along the notch; the flutter valve preferably having low impedance characteristics imparted by a push-in and withdrawable fluid-filling block and stems that enable ready deflation and re-inflation of the chambers. The valve is also useful with other chamber bladder configurations, including undivided single chambers, among others.

10 Claims, 3 Drawing Sheets

FLUTTER VALVE ASSEMBLY FOR INFLATABLE PACKAGING AND THE LIKE

This application is a continuation of application Ser. No. 08/278,610 filed on Jul. 21, 1994, and now abandoned.

The present invention relates to fluid flutter valve air or other fluid inflation assemblies, being more particularly directed to the inflation or deflation of thin film envelopes or balloons for such purposes as packaging and protecting delicate or other products and materials for shipment.

BACKGROUND OF INVENTION

In co-pending application Ser. No. 092,750, filed Jul. 16, 1993 for Inflatable Flat Bag Packaging Cushion and Methods of Operating And Making The Same, there is disclosed an improved adjacent T-chamber, balloon or thin film flexible envelope packaging system, inflatable, for example, by injecting air simultaneously into the envelope chambers through a single inflation inlet. The inlet is provided with a self-sealing flutter valving mechanism, enabling independent chamber filling and sealing; and such being also deflatable to permit reuse of the envelopes.

A flutter type valve in the manufacturing of thin film inflatable envelopes or chambers is extremely economical consisting merely of a flat (collapsed) thin-film tube partially inserted into the chamber, and providing good self-sealing characterisitics. Such can be shipped as a flat tube as part of the flat inflatable envelope into which it is inserted. The key to making a flutter valve work is that it actually flutters during filling within the pressurized chamber or envelope; the inside of the flat inlet tube of the valve being at atmospheric pressure, while its exterior, which is disposed inside the inflating chamber, is pressurized from all sides with greater pressure, thus self-sealing the valve. In effect, the more the inflation pressure in the chamber is increased, the greater the sealing capacity of the valve.

While attempts have been made for similar and other applications to provide inexpensive and simply manufactured reuseable inflation and sealing valve assemblies, improvement in the prevention of leakage once the envelopes are inflated and in use in shipping or other applications, continues to be desired.

Included in the prior art valves for these types of structures have been what may be generally termed as single flutter valves insertable into the balloon or envelope into which the air, for example, may be introduced to enable inflation, and having various different types of sealing mechanisms operable once inflation is effected. Representative of such devices are those disclosed, for example, in U.S. Pat. Nos. 1,702,974; 2,700,980; 3,230,663 3,297,152 3,332,415 3,491,791; 3,664,058; 4,674,532; 4,758,198; and 4,917,646. Single flutter valves, however, do not lend themselves, to specific problems attendant multiple, side-by-side or adjacent envelopes, or chambers, such as those disclosed in said copending application.

Attempts have also been made, accordingly, to provide dual valve configurations, such as V-shaped structures disclosed, for example, in U.S. Pat. Nos. 3,319,879; 3,586,038; 4,111,228; 4,703,463; but such generally involve complicated and relatively costly constructions, lacking the simplicity of the type of flutter valves above discussed. Dual valves for inflation of inner and outer balloons or the like have been described in U.S. Pat. No. 5,108,339; but such are also not suitable for side-by-side or adjacent envelope or chamber operation herein described, requiring separate valves for each chamber to permit of fluttering inflation. In addition, each such valve would have to be individually inflated.

Still another prior proposal is presented in Japanese Utility Model Publication Sho-62-166261, published Nov. 16, 1989, in which the heat-sealing between adjacent inflation chambers also seals the lateral sides of the valve, preventing flutter inside the chamber.

In addition, the opening of the current flutter valves commonly range from 0.5–1.5 cm. Thus, under low pressure filling systems, such valves apply considerable impedance to the filling medium as it enters the air chamber. The use of "low impedance" valves (i.e. flutter valves with openings greater than 2 cm) are not commonly used because such valve layers tend to misalign during closure and create air paths leaks.

Deflation systems that are commonly used for deflating inflatable structures that use single aperture flutter valves include using single hollow stems or straws as described in U.S. Pat. No. 1,169,804. Single stem systems are not adquate for multiple aperture flutter valves since they require multiple insertions in each opening of the valve for deflation. In addition, forcing a stem through a valve especially in the region of the valve that is heat sealed to the exterior perimeter of an inflatable structure often causes damage to the valve. Possible damage from reinsertion of a straw like member into the valve for deflation (as is required when using a single stem system) becomes very likely with multiple aperture valves.

Another deflation method used with inflatable structures that employ flutter valves is described in U.S. Pat. No. 5,272,856. Such a system employs separate deflation ports that are sealed with tapes to provide a reusable inflatable product. This system is not adequate for simultaneously deflating plural chamber inflatables. Using such systems for multiple chamber designs would require either a single long tape closure or multiple tape closures to seal the multiple deflation ports. Not only would such a system be cumbersome to use but it is inherently expensive to manufacture.

OBJECTS OF INVENTION

An object of the present invention, accordingly, is to provide a new and improved flutter valve assembly for the independent inflation of adjacent thin-film envelope chambers, having improved leakage-prevention characteristics and being of extremely low cost for manufacturing purposes.

It is another object of this invention to provide a novel low impedance self-sealing valve.

It is also a purpose of this invention to provide an inexpensive novel deflation system that is quick and effective to use in conjunction with a multiple aperture flutter valve.

Other and further objects will be explained herein-after and are more particularly pointed out in connection with the appended claims.

SUMMARY

In summary, from one of its viewpoints, the invention embraces a flutter valve assembly for independent fluid inflation of a pair of adjacent thin film envelope chambers formed from inner and outer thin films sealed along their outer peripheries, and having, in combination, a flexible flat tubular plastic strip open at an inlet end to permit the introduction of inflating fluid into and along the interior space of the flat tubular strip and exiting at its other outer end; the strip being divided at said outlet end by a notch formed inwardly and sealed along the edges of the notch to provide a pair of separated outlets, the inner sealed edges of which diverge from one another toward the outlet end; the outlet end of the strip being inserted at an intermediate region of and between the inner and outer thin films a predetermined distance therewithin; a seal extending along the peripheral perimeter of the thin films and also sealing the inner adjacent edges thereof at the said intermediate region to the outer surfaces of the inserted flat tubular strip, but not sealing the flat tubular space therewithin; and a seal extending transversely of the thin films dividing the same into the said pair of adjacent envelope chambers and extending within the notch to provide for independent and separate inflation of each of the pair of envelope chambers through the corresponding one of said outlets; and with the outlets being unconstrained and free independently to flutter during inflation, with the pressure created by such separate envelope chamber inflation sealing the corresponding outlet to prevent leakage of the fluid after inflation.

Best mode and preferred constructions and techniques are hereinafter presented in detail.

DRAWINGS

The invention will now be described in connection with the accompanying drawings:

FIG. 1 of which is a plan view illustrating a flat tubular valve constructed in accordance with the present invention, being assembled upon a lower thin film constituting an outer surface of the ultimate inflatable envelope chamber;

DESCRIPTION OF PREFERRED EMBODIMENT
(S)

Figure 1:
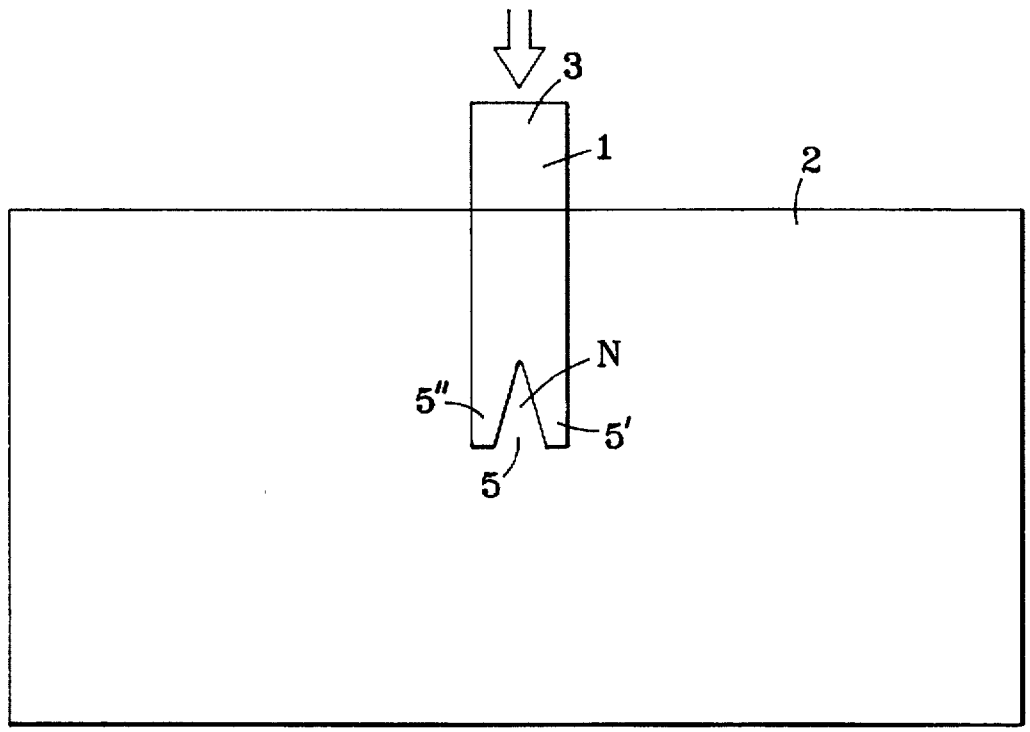

Referring to FIG. 1, a thin film layer is shown at 2, as of polyethelene film carrying a metallized exterior, if desired, and which is to serve as one side (shown as the lower) of the ultimate inflatable envelope chamber structure. In accordance with the invention, the valve is formed from a thin film flat collapsed tubular rectangular strip 1, also as of polyethelene, open at an inlet end 3 and which is to extend outside the ultimate envelope for inflation purposes. The interior space within the flat tubular strip is adapted thus to inflate as the fluid, such as air, is introduced into the inlet end 3, as shown in the dotted lines in FIG. 3, inflating the inner tube space and passing out the outlet end 5, extending inwardly by the edge of the layer 2 at an intermediate region thereof.

In accordance with the invention, the longitudinal side walls of the flat tubular strip valve 1 are sealed; and the outlet end 5 is provided with a notch N, shown as of substantially V or U shape or the like, dividing the outlet end into two outlets 5' and 5" separated by the space of the angle formed by the notch. The inner adjacent edges of the outlets 5' and 5" are thus free of one another and somewhat diverge, as shown, for purposes later explained, with the adjacent but spaced inner diverging edges being also sealed along the edges of the V, forming independent separate outlets.

Figure 2:
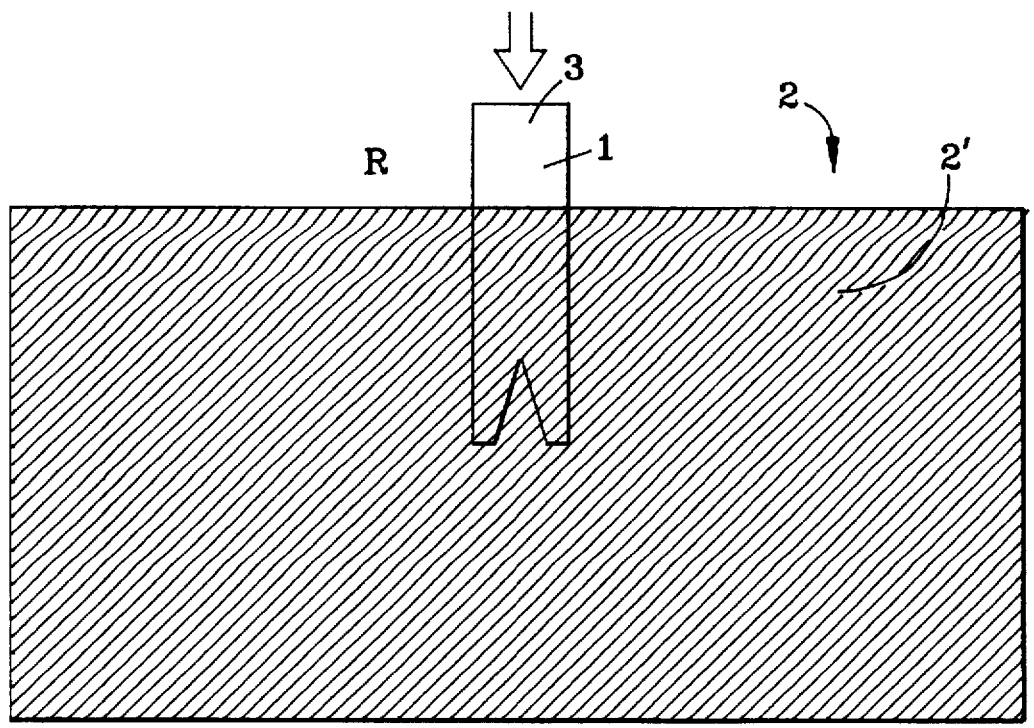
FIG. 2 is a similar view showing the application of the outer or upper thin film over the valve.

To complete the formation of the inflatable envelope chamber, an upper or other opposing thin film layer 2 is shown in FIG. 2 overlying the bottom layer 2 and with the valve strip 1 inserted at an intermediate region R between the inner and outer thin films 2 and 2' and extending a predetermined distance therewithin.

Figure 3:
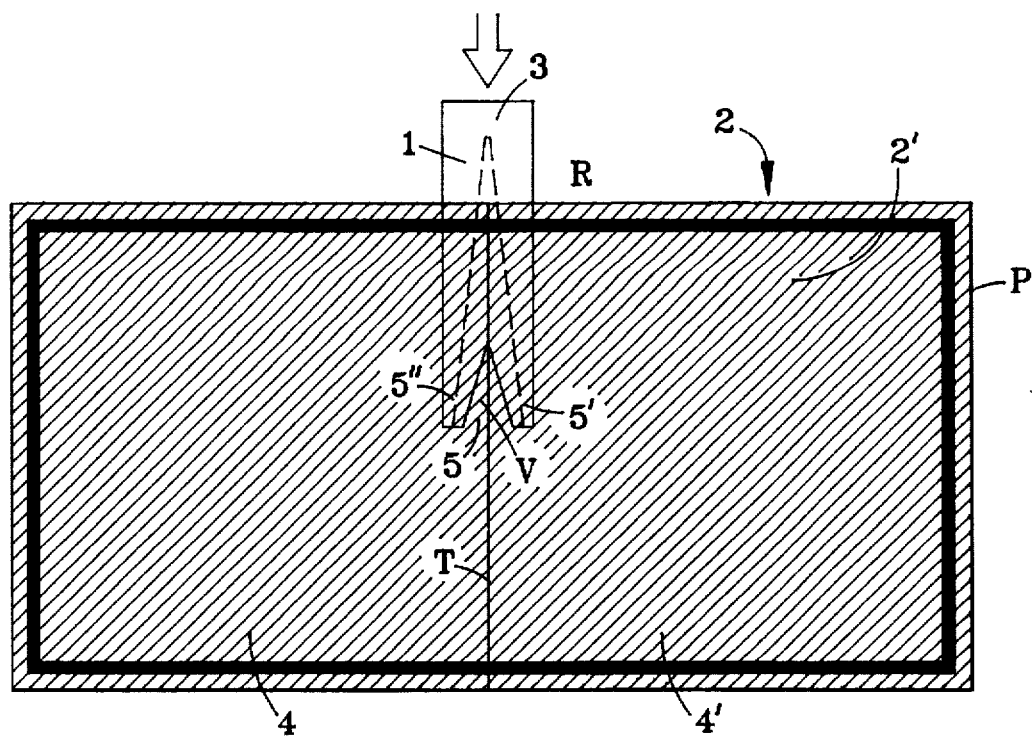
FIG. 3 is a view showing the peripheral seals and ultimate formation of the adjacent envelope chambers in accordance with the present invention.

The envelope chambers are now ready for sealing. In FIG. 3, the peripheral perimeter of the overlayed thin films 2 and 2' is shown sealed, as by heat sealing. In the vicinity of the intermediate region R, however, the heat sealing only seals the inner adjacent edges of the inner and outer thin films 2 and 2' to the outer opposite surfaces of the thin tubular flat valve strip 1, without sealing the interior space of the tubular valve strip. Thus, there is complete integrity of seal for the overlayed thin films 2 and 2' and the valve 1.

Further in accordance with the invention, the envelope thus formed is divided into a pair of adjacent envelope chambers 4 and 4', FIG. 3, by a transverse heat seal T extending from the lower sealed periphery, transversly upward and into the V notch of the portion of the valve 1 sealed within the region R. The two independent adjacent envelope chambers 4 and 4' share a common vertex along their adjacent inner edges, as described in said co-pending application, being thus adaptable to receive and fold-over so as to protect, for example, an item to-be-shipped. The transverse seal T also insures the independent and separate filling of the 4 chambers 4 or 4' through the common inlet 3 of the valve 1 and through the respective outlets 5' and 5'. With this construction, the outlets 5' and 5 are unconstrained in their independent filling fluttering action. This has been found, when each of the envelope chambers 4 and 4' has been inflated, that vastly improved air or other fluid sealing is attained. The greater pressure of the inflation air in the envelope chambers 4 and 4', pressing down in the regions of the valve outlets 5' and 5" shown in dotted lines, holds them positively sealed against the escape of the inflating fluid back out the valve 1.

The simple and inexpensive structure of the valve of the invention with its novel notching of the outlet end of the flutter valve, has rendered the invention extremely useful for the multiple-chamber and similar cushioning purposes. In actual manufacture, the following preferred fabrication techniques may be used to provide low cost, as well. In making the valve, the bottom area of the flattened tube is printed with spaced ink spots (that serve as heat-seal resistant areas) so that the vertex line T can still seal across the valve and islolate each chamber. Once the bottom plastic sheet 2 has been printed on, the upper sheet 2' is placed on top and simultaneously transversely sealed along the edge of the notch which is punched out at the same time. The valves may be manufactured in line, or they can be manufactured edge by edge for applications similar to those in FIG. 4. In heat-sealing the valve to the envelope or inflatable structure, the valve is first placed in between the layers 2 and 2'. The top edge seal is made over the valve followed by the transverse seal T through the middle of the valve in between the ends 5' and 5" of the valve.

Figure 4:
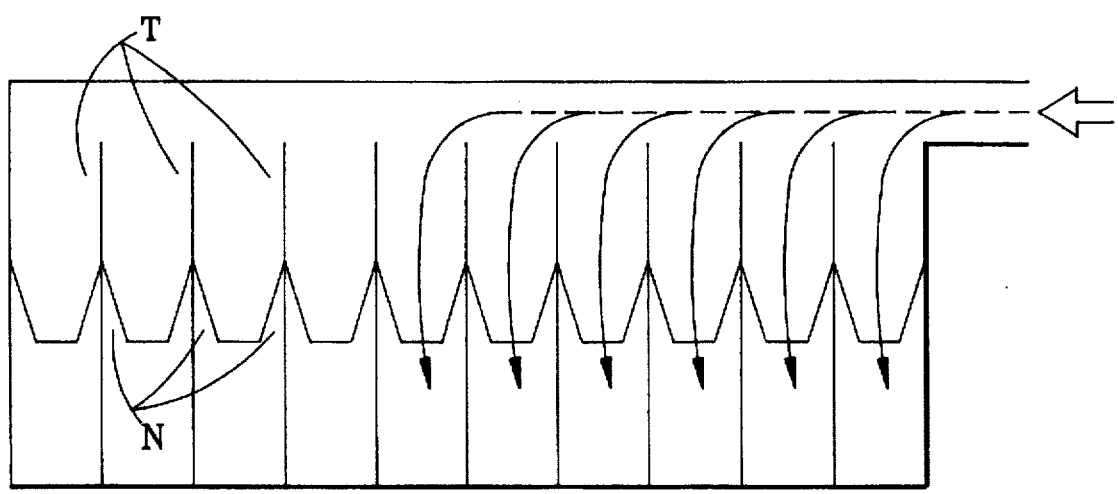
FIG. 4 is a view of a modified multi-chamber system.

Additionally, as in FIG. 4, a strip of valves which are not separated from one other, can be formed, having adjoining edges on the lateral sides of the valve between the films and with consecutive transverse seals effected, followed by the top seal. This can be done in an in-line process in which a transverse seal is made and then a partial top surface seal is made which does not extend into the next valve outlet.

Figure 5:
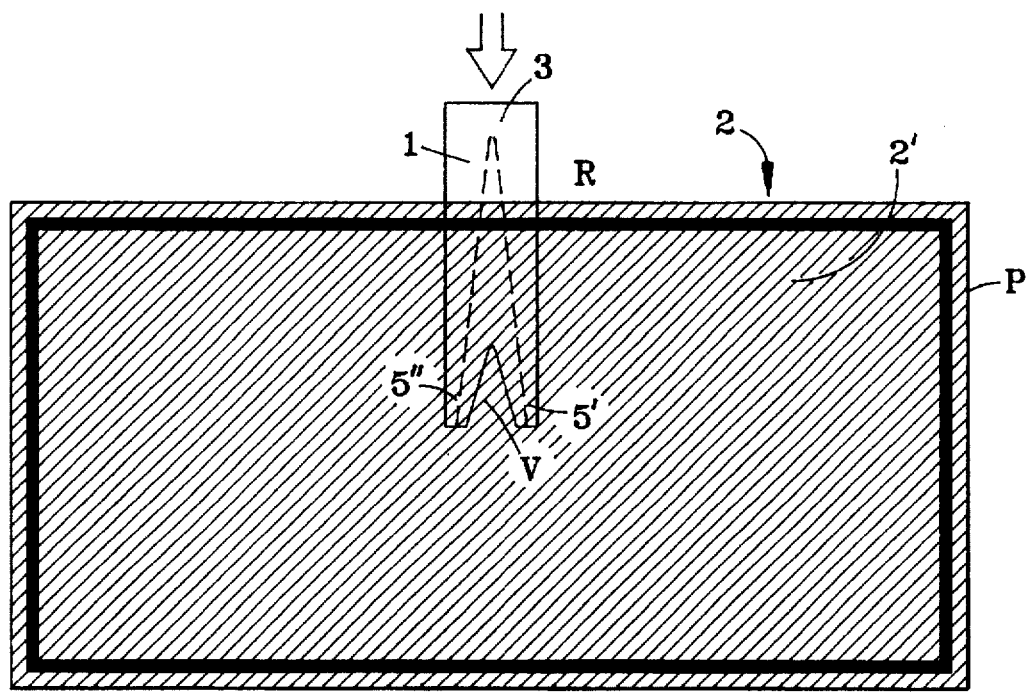
FIG. 5 is a view of a simple chamber system employing the novel valve for its low-impedance characteristics.

The use of a modified multiple opening flutter valve for low impedance filling applications is shown in FIG. 5. Each opening of the valve preferably measures 1–2 centimeters, thus providing effective self-sealing; while the combined effect of multiple apertures for filling the same chamber provides low impedance characteristics to the valve. For example, a valve with two apertures of 1 cm has 4 times less resistance to air passage than a single valve with a 1 cm opening; thus requiring four times less pressure to inflate at the same rate or, conversely, increasing the fill rate by 4 times for the same fill pressure.

Figure 6:
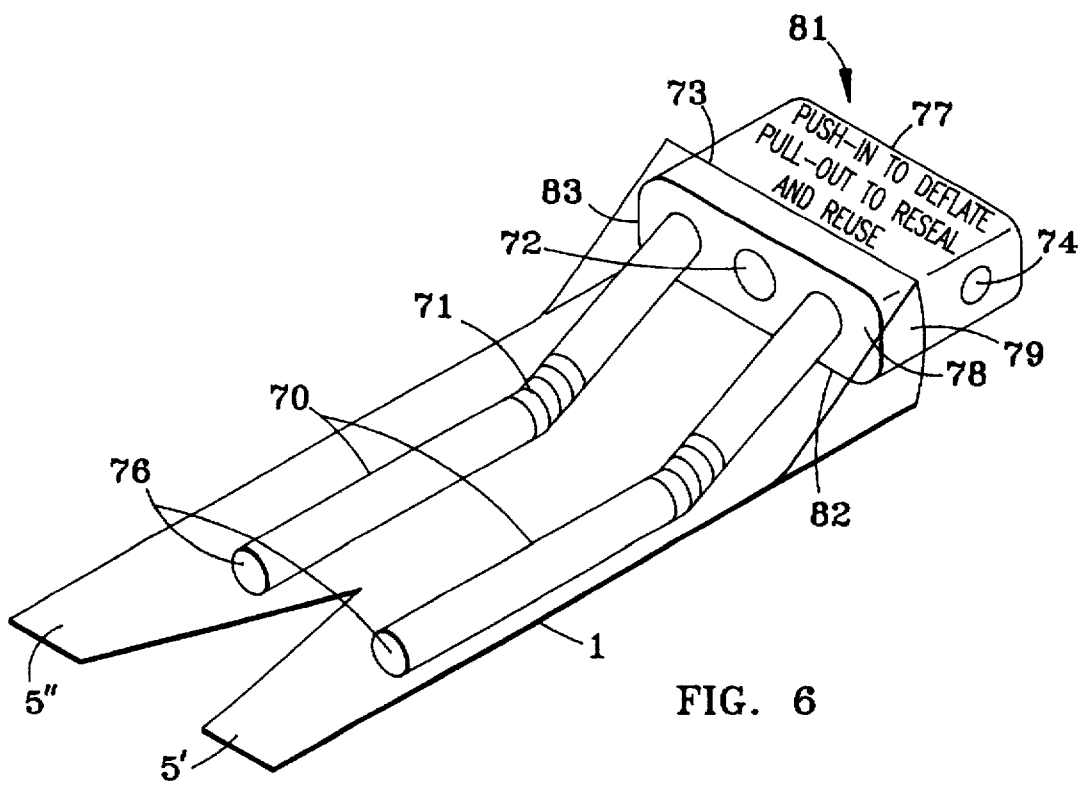
FIG. 6 is an isometric view of a deflation stem used in conjunction with such a valve.

If it is desired to reuse the inflated chambers once they have been used for the packaged cushioning of a shipped itedm it is merely necessary to use a deflation unit such as that described in FIG. 6. Such unit is composed of an air transfer housing block 81 and a plurality of depending hollow stems 70 placed inside valve 1. During deflation of an inflatable structure equipped with such a valve 1 (held stationary to the inflatable structure in the region R) the ends 76 of the stems 70 extend and force open valves 5' and 5". The air is then allowed to exit through openings at 76 in the hollow stems 70, and connecting air ports similar to 74 in the air transfer housing. After complete deflation, the deflation unit is pulled back out of the valve 1 so as to allow the valve ends 5' and 5" to reseal themselves. The inflatable structure is thereafter ready for re-filling.

The air transfer housing 81 may be permanently sealed to valve 1 along the contacting edges, or in some cases, only partially along the perimeter as shown at edges 73 and 82 (with gaps shown at 79 and 83). During filling, as with high pressured air at surface 77 through the central air port 72, flanked by the stems 70 and shown at surface 78 extending through the air housing 81 to surface 77, such gaps 79 and 83 provide vents to avoid over pressurization. Over pressurization is also avoided as air may escape through the hollow members 70 and exit at port 74 during filling. In addition, equalized pressurization of air chambers filled by ends 5' and 5" of valve 1 is insured as the air from port 72 can flow freely in the region R between both valve ends 5' and 5'.

The stems 70 of such deflation systems may have cross-sections that include circular, cross-like, rectangular, and screw shapes. Such stems are flexible in the region R of the valve, as at 71, to permit twisting or folding of the valve and deflation unit in the region R. Such stems also having ends 76 that have rounded edges so as to avoid damage to the valve interior and ends 5' and 5'.

Thus the modified valve structure of FIG. 6 employs multiple deflation stems 76.

In a practical valve formed of 0.05 mm thick polyethelyne, the valve was of the order of 18 cm in length, with the flutter outlets 5' and 5" about 1 cm in width and 4.5 cm in length, and with a diverging V angle of about 30°. Seals with negligible leakage were obtained with air filling.

While the novel flutter valve and inflating and deflating mechanisms thereof, as above shown, are particularly designed and useful for the multiple chamber cushioning structures of the invention, provided by dividing the chamber into a pair of adjacent chambers as in FIG. 3, the valve is also useful with undivided or simple inflatable chamber structures, FIG. 5, and other configurations as well.

Further modifications will also occur to those skilled in this art and such are considered to fall within the spirit and scope of this invention as defined in the appended claims.

I claim:

1. A combination flutter valve envelope chamber assembly having an independently fluid inflating pair of adjacent thin film envelope chambers formed from inner and outer thin films sealed along their outer peripheries, and having, in combination with the envelope chambers, a flexible flat tubular plastic strip having an open inlet end to permit the introduction of inflating fluid into the flat tubular strip, and an outlet end; the strip being divided at said outlet end by a notch formed inwardly and sealed to provide a pair of separated outlets which diverge from one another toward the outlet end; the outlet end of the strip being inserted at an intermediate region of and between the inner and outer thin films a predetermined distance therewithin; a seal extending along the peripheries of the thin films and also sealing the inner edges thereof at said region to the outer surfaces of the inserted flat tubular strip, but not sealing the flat tubular space therewithin; and a seal extending transversely of the thin films dividing the same into the said pair of adjacent envelope chambers and extending within the notch to provide for independent and separate inflation of each of the pair of envelope chambers though the corresponding one of said outlets; and with the outlets being unconstrained and free independently to flutter during inflation, with the pressure created by such separate envelope chamber inflation sealing the corresponding outlet to prevent leakage of the fluid after inflation.

2. A flutter valve assembly as claimed in claim 1 and in which the flat strip is substantially rectangular and the notch is of substantially V or U shape.

3. A flutter valve assembly as claimed in claim 1 and in which the peripheral and transversely extending seals are heat seals.

4. A flutter valve assembly as claimed in claim 3 and in which means is provided on an inner surface of the flat tubular strip for preventing sealing of the inflation space thereof as the edges of the thin film at said region are heat-sealed to the outer surfaces of the strip.

5. A flutter valve assembly as claimed in claim 4 and in which the seal-preventing means comprises a heat-seal resistant coating.

6. Apparatus as claimed in claim 1 and in which the adjacent chambers are foldable along the notch to contain therebetween an article to be cushioned and protected as for shipment.

7. Apparatus as claimed in claim 1 and in which the valve inlet is provided with an air transfer housing block having air port means and adapted to be pushed into and pulled out of the inlet for chamber deflation and inflation purposes, the housing being provided with hollow inflation stems flanking the air port means and extending into each flutter valve outlet to open the same when the housing is pushed into the valve inlet so as to enable deflating the chamber through the stems and housing block, and being with drawn from the flutter valve outlets to enable them to re-seal to permit inflation of the chamber through the valve inlet and housing block port means.

8. Apparatus as claimed in claim 7 and in which the air transfer housing block is provided with means for venting against over-pressurizing during inflation.

9. Apparatus as claimed in claim 8 and in which said venting means comprises gaps vented externally of the housing block.

10. Apparatus as claimed in claim 7 and in which the adjacent chambers are foldable along the notch to contain therebetween an article to be cushioned and protected.

* * * * *